(12) United States Patent
Young

(10) Patent No.: US 12,384,722 B2
(45) Date of Patent: Aug. 12, 2025

(54) BOTTOM ASH AGGREGATE MATERIAL AND METHOD FOR FORMING BOTTOM ASH AGGREGATE MATERIAL

(71) Applicant: Michael J. Young, Stewartstown, PA (US)

(72) Inventor: Michael J. Young, Stewartstown, PA (US)

(*) Notice: Subject to any disclaimer, the term of this patent is extended or adjusted under 35 U.S.C. 154(b) by 894 days.

(21) Appl. No.: 17/285,521

(22) PCT Filed: Nov. 14, 2019

(86) PCT No.: PCT/US2019/061366
§ 371 (c)(1),
(2) Date: Apr. 15, 2021

(87) PCT Pub. No.: WO2020/102476
PCT Pub. Date: May 22, 2020

(65) Prior Publication Data
US 2021/0387912 A1 Dec. 16, 2021

Related U.S. Application Data

(60) Provisional application No. 62/767,725, filed on Nov. 15, 2018.

(51) Int. Cl.
*C04B 18/10* (2006.01)
*C04B 28/02* (2006.01)
*C04B 111/10* (2006.01)

(52) U.S. Cl.
CPC .............. *C04B 18/10* (2013.01); *C04B 28/02* (2013.01); *C04B 2111/105* (2013.01)

(58) Field of Classification Search
CPC ....... C04B 18/06; C04B 18/10; C04B 18/305; C04B 20/0076; C04B 20/023; C04B 2111/105; C04B 28/02; Y02W 30/91
See application file for complete search history.

(56) References Cited

U.S. PATENT DOCUMENTS

| | | |
|---|---|---|
| 8,905,242 B2 | 12/2014 | Vandemierden |
| 9,573,139 B2 | 2/2017 | Vandemierden |

(Continued)

FOREIGN PATENT DOCUMENTS

| | | |
|---|---|---|
| WO | 2013156843 A1 | 10/2013 |
| WO | 2015020612 A1 | 2/2015 |

OTHER PUBLICATIONS

Rübner et al., Use of municipal solid waste incinerator bottom ash as aggregate in concrete Nov. 2008Quarterly Journal of Engineering Geology and Hydrogeology 41(4):459-464 (Year: 2018).*

(Continued)

*Primary Examiner* — Shuangyi Abu Ali
(74) *Attorney, Agent, or Firm* — Saxton & Stump, LLC (57) ABSTRACT

A method for forming a treated reclaimed bottom ash sand and a treated reclaimed bottom ash sand. The method includes providing reclaimed bottom ash sand. The reclaimed bottom ash sand is contacted with an aqueous composition having 0.5 to 3.0M NaOH for a time greater than about 4 hours. The NaOH contacted reclaimed bottom ash sand is rinsed and decanted and iron is removed to form a treated reclaimed bottom ash sand having reduced hydrogen formation in concrete compared to the hydrogen formation of concrete utilizing reclaimed bottom ash sand. The treated reclaimed bottom ash sand includes reactive aluminum of less than 50% by weight of the reactive aluminum in the reclaimed bottom ash sand and the treated reclaimed bottom ash sand includes less than 2 wt % iron. A concrete formed from the treated reclaimed bottom ash sand is also disclosed.

16 Claims, 5 Drawing Sheets

(56) References Cited

U.S. PATENT DOCUMENTS

| | | |
|---|---|---|
| 10,118,182 B2 | 11/2018 | Vandemierden |
| 2012/0298562 A1 | 11/2012 | Vandemierden |
| 2013/0313167 A1 | 11/2013 | Vandemierden |
| 2015/0020701 A1 | 1/2015 | Vandemierden |
| 2017/0157620 A1 | 6/2017 | Vandemierden |

OTHER PUBLICATIONS

Xuan et al. Removal of metallic Al and Al/Zn alloys in MSWI bottom ash by alkaline treatment; Journal of Hazardous Materials 344 (2018) pp. 73-80; www.elsevier.com/locate/jhazmat; https://doi.org/10.1016/j.jhazmat.2017.10.002.

Kim et al. Effect of chemical treatment of MSWI bottom ash for its use in concrete; Magazine of Concrete Research 2015; vol. 67, Issue 4, pp. 179-186; http://dx.doi.org/10.1680/macr.14.00170.

Dou et al. Review of MSWI bottom ash utilization from perspectives of collective characterization, treatment and existing application; Renewable and Sustainable Energy Reviews 70 (2017) pp. 24-38; www.elsevier.com/locate/rser; http://dx.doi.org/10.1016/j.rser.2017.05.044.

Mathews IV et al. Evaluation of reclaimed municipal solid waste incinerator sands in concrete; Journal of Cleaner Production 229 (2019) pp. 838-849; www.elsevier.com/locate/jclepro; https://doi.org/10.1016/j.jclepro.2019.04.387.

Rubner et al. Use of municipal solid waste incinerator bottom ash as aggregate in concrete; Quarterly Journal of Engineering Geology and Hydrogeology 41, pp. 459-484; DOI 10.1144/1470-9236197-936.

Pera et al. Use of Incinerator Bottom Ash in Concrete; Cement and Concrete Research, vol. 27, No. 1, pp. 1-5, 1997.

ASTM International Designation: C1761/C1761M-17; Standard Specification for Lightweight Aggregate for Internal Curing of Concrete.

ASTM International Designation: C331/C331M-17; Standard Specification for Lightweight Aggregates for Concrete Masonry Units.

ASTM International Designation: C330/C330M-17a; Standard Specification for Lightweight Aggregates for Structural Concrete.

ASTM International Designation: C33/C33M-18; Standard Specification for Concrete Aggregates.

* cited by examiner

BOTTOM ASH AGGREGATE MATERIAL AND METHOD FOR FORMING BOTTOM ASH AGGREGATE MATERIAL

CROSS-REFERENCES TO RELATED APPLICATIONS

This application claims the benefit of U.S. Provisional Application No. 62/767,725, filed Nov. 15, 2018, which is incorporated by reference herein in its entirety.

BACKGROUND OF THE INVENTION

Across the world, solid waste is managed in a number of ways including reduction through oxidation/combustion. When curbside municipal solid waste goes through a Waste-to-Energy (WtE) or Energy from Waste (EfW) process, the incineration results in combustion byproducts, commonly referred to as "ash", partially burned and unburned material, ferrous and non-ferrous metals and nonmetallic materials, such as glass and concrete. Various fractions of the residual may be segregated for further beneficial use, rather than landfill as is the current practice.

Municipal solid waste incinerator (MSWI) ash is not recycled in the U.S. due to: a) a lack of state and federal regulations governing the performance of MSWI ash as a construction material, and b) the absence of a MSWI ash product that can meet both Department of Environmental Protection (DEP) permit requirements and structural performance standards for building products, such as concrete. Instead MSWI ash is sent to a landfill once it can be classified through the Environmental Protection Agency (EPA) standards as a non-hazardous material via a Toxicity Characteristic Leaching Procedure (TCLP) test. The DEP limits are not adequate to mitigate strength reduction in construction materials due to the presence of aluminum. In concrete, the aluminum in MSWI ash produces hydrogen gas that pushes the material outwards leading to volume changes, shrinkage, and cracking. This has a deleterious effect on the shrinkage and compressive strength of concrete.

Bottom ash has been considered as a potential replacement for fine aggregate used for many concrete based applications. Attempts have been made to process bottom ash into a material that is capable of being used in concrete. However, a significant aluminum presence in the known processed bottom ash limits the use of these materials in concrete applications. It is believed that the aluminum is drawn into the ceramic and glass components of this bottom ash during the Waste-to-Energy combustion process. When known processed bottom ash material is substituted for virgin fine aggregates, the high pH environment caused by the presence of cement and water cause a corrosive reaction with aluminum and iron. The aluminum will oxidize resulting in the formation of hydrogen gas. This reaction causes pockets of entrapped gas exerting internal pressures within the concrete matrix, causing unwanted expansion of the material. This results in a structural deficiency and reduced overall soundness. In its current state, currently known separated and washed bottom ash materials have little benefit as an aggregate replacement for fine aggregate in concrete. These known processed bottom ash materials, which make up approximately 25% of the total bottom ash stream, are being landfilled currently. In addition, bottom ash material treated according to known techniques utilized in lightweight fine aggregate replacement for structural concrete and Concrete Masonry Units (ASTM C330/C331) have significant drawbacks. The bottom ash material treated according to known techniques causes iron staining and leads to possible pop-outs on the surface of the concrete masonry units, especially sealed or painted products. These pop-outs are caused by the formation of hydrogen gas over time.

What is needed is a reclaimed material from bottom ash that is suitable for use in building materials and does not suffer from the drawbacks of the prior at.

BRIEF DESCRIPTION OF THE INVENTION

In an embodiment, the present invention includes a method for forming a treated reclaimed bottom ash sand. The method includes providing reclaimed bottom ash sand having a particle size of less than about ⅜ inch, a specific gravity greater than 1.0, a moisture content of less than 25 wt %, at least 0.5 wt % reactive aluminum and less than 40 wt % iron. The reclaimed bottom ash sand is contacted with an aqueous composition having 0.5 to 3.0M NaOH for a time greater than about 4 hours. The NaOH contacted reclaimed bottom ash sand is rinsed and decanted. Iron is removed from the rinsed and decanted reduced metallic aluminum reclaimed bottom ash sand to less than 5.0 wt % iron to form a treated reclaimed bottom ash sand having reduced hydrogen formation in concrete compared to the hydrogen formation of concrete utilizing reclaimed bottom ash sand. The treated reclaimed bottom ash sand includes reactive aluminum of less than 50% by weight of the reactive aluminum in the reclaimed bottom ash and the treated reclaimed bottom ash sand includes less than 2 wt % iron.

In another embodiment, the present invention includes a treated reclaimed bottom ash sand. The exemplary treated reclaimed bottom ash sand includes calcium carbonate and silica, less than 5 wt % reactive aluminum, less than 5 wt % iron, less than 2 wt % friable particles, less than 5 wt % material with specific gravity less than 1.0, less than 5 wt % material passing #200 sieve, and greater than 85 wt % passing #4 sieve. The treated reclaimed bottom ash sand includes reduced hydrogen formation in concrete compared to the hydrogen formation of concrete utilizing reclaimed bottom ash sand.

In another embodiment, the present invention includes a concrete composition. The concrete compositing includes cement, a fine aggregate having a virgin material and a treated reclaimed bottom ash sand, according to the present invention, a natural coarse aggregate, and water.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a process for forming a treated reclaimed bottom ash sand, suitable for use, for example, in structural concrete that does not suffer from the drawbacks of known refining processes. In addition, the treated reclaimed bottom ash sand is suitable for use in masonry, normal weight structural concrete, lightweight structural concrete, internal curing applications, or specialized mortars. The treated reclaimed bottom ash sand, according to the present disclosure, provides reduced shrinkage when incorporated into concrete due to the resolution of stress using water filled pores within the fine aggregate. In addition, the treated reclaimed bottom ash sand, according to the present disclosure, has reduced permeability when incorporated into concrete by producing a more consistent cement matrix. In addition, the treated reclaimed bottom ash sand, according to the present disclosure, provides a reduction in weight of the overall structure when incorporated into concrete. In addition, the treated reclaimed bottom ash sand, according to the present disclosure, provides better hydration of cement. All of this leads to longer life span of the structure with reduced maintenance costs.

In certain embodiments, treated reclaimed bottom ash sand may be utilized as a lightweight fine aggregate replacement for structural concrete and Concrete Masonry Units according to ASTM Standard Specification for Lightweight Aggregates for Structural Concrete C330 (July 2017) (ASTM C330).

The compositions and methods of the present disclosure can comprise, consist of, or consist essentially of the essential elements and limitations of the disclosure described herein, as well as any additional or optional ingredients, components, or limitations described herein or otherwise useful.

All percentages, parts and ratios herein are based upon the total weight of the compositions of the present disclosure, unless otherwise indicated.

Where the following terms are used in this specification, they are used as defined below.

The terms "comprising," "having," and "including" are used in their open, non-limiting sense.

The terms "a" and "the" are understood to encompass the plural as well as the singular.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

"Bottom ash", as utilized herein, is non-combustible residue resulting from the incineration of, for example, municipal, construction, health or other waste stream, in a power plant, boiler, furnace or incinerator. The bottom ash material may include traces of fly ash, heavy metals and combustible materials. Although not so limited, an exemplary bottom ash material may include about 34 wt % calcium and about 14 wt % silica and about 39.5 wt % metal compounds.

"Reclaimed bottom ash sand", as utilized herein, is a treated bottom ash material that has, at minimum, been sized and rinsed to remove certain materials, such as fly ash. Reclaimed bottom ash is preferably ¼ inch and smaller with 90% passing a #4 sieve. In addition, reclaimed bottom ash sand includes a moisture content of 25 wt % or less and have a specific gravity greater than 1.0.

"Reactive aluminum", as utilized herein, is a form of aluminum that reacts to form hydrogen. In particular, reactive aluminum is a form of aluminum that reacts in high pH environments or in concrete to form hydrogen. Exemplary forms of reactive aluminum may include, but are not limited to, metallic aluminum, aluminum hydroxide ($Al(OH)_3$), aluminium oxyhydroxide ($AlO(OH)$) and alumina ($Al_2O_3$).

"Friable particles", as utilized herein, are particles or materials that as utilized herein, are particles or materials that are unsound and can be deformed easily, such as clay.

As used herein, "structural lightweight concrete" also includes aggregate that is either entirely lightweight aggregate or a combination of lightweight and normal density aggregate. As used herein, "lightweight aggregate", according to ASTM Standard Specification for Lightweight Aggregates for Structural Concrete C330 (July 2017)(ASTM C330), has a bulk density of less than 1120 kg/m3 (70 lb/ft3) for fine aggregate and less than 880 kg/m3 (55 lb/ft3) for coarse aggregate. As used herein, the terms "fine" and "coarse" refer to the average particle size of the aggregate and additives of the structural lightweight concrete. As used herein, "average particle size" refers to the longest linear dimension of the particle. In terms of the present disclosure, "coarse" may refer to having an average particle size of greater than 1.5 mm, preferably greater than 5 mm, preferably greater than 10 mm, while "fine" may refer to having an average particle size of 1.5 mm or less, preferably 1.0 mm or less.

The method according to the present disclosure provides removal of deleterious reactive aluminum chemically versus physically because the aluminum agglomerates to the aggregate particles in the bottom ash. The agglomerated aluminum present within the ceramic particles is achieved through a combination of chemical catalyst reaction, agitation, and elevated temperature. The removal of the agglomerated aluminum also reduces ferrous particles, which may be removed by a magnetic field. This aluminum removal process allows for better removal of this ferrous component, eliminating the negative side effects of having this deleterious material in the concrete matrix. In combination, these processes make the recycled fine aggregate suitable for use in concrete.

Bottom ash for use in the process, according to the present invention, is pretreated to form a reclaimed bottom ash sand. The material is classified through a gradation separation and rinsing process. The reclaimed bottom ash sand is a fine aggregate that is classified and evaluated to determine whether the reclaimed bottom ash is suitable for treatment to form the treated reclaimed bottom ash sand suitable for beneficial use.

Figure 1:
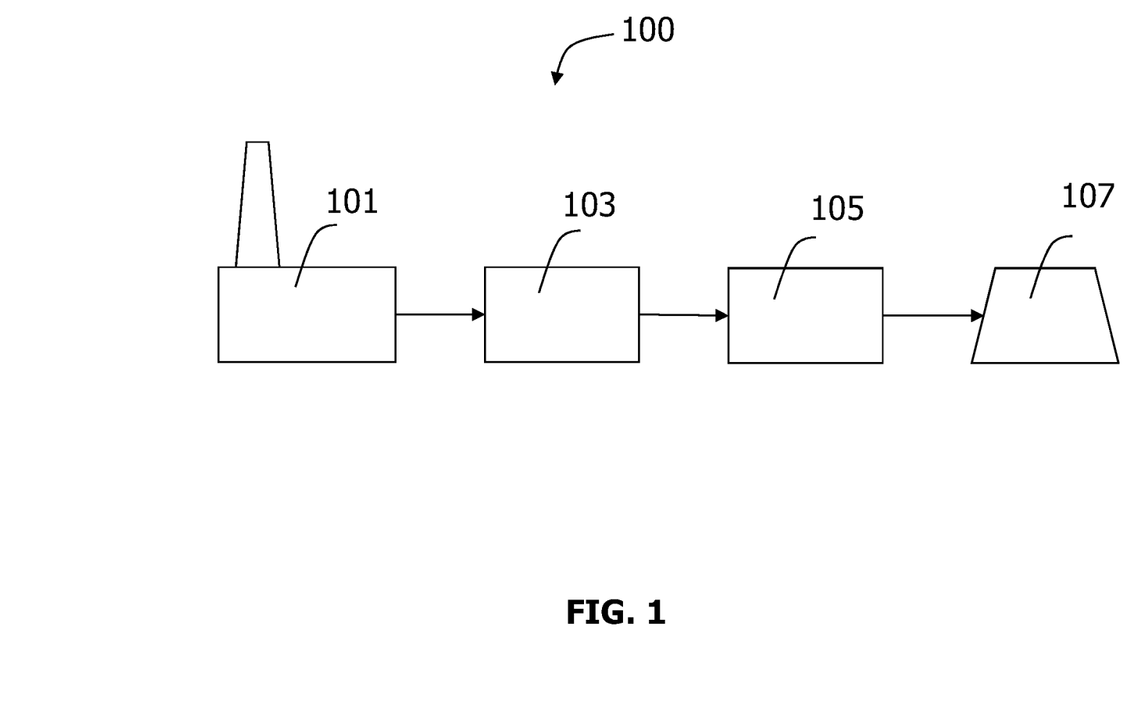
FIG. 1 shows a schematic view of a system for producing reclaimed bottom ash sand, according to an embodiment of the present invention.

FIG. 1 schematically shows a pretreatment system 100 for forming reclaimed bottom ash sands from bottom ash. In pretreatment system 100, bottom ash 100 is formed in an incinerator 101, such as a municipal waste to energy facility, and separated from other waste streams, such as fly ash and slag. The separated bottom ash from incinerator 101 is provided to a density separation system 103, including components, such as power screens, shaker screens, wet drum, or air centrifugal drum, that sorts the bottom ash material into sizes suitable for forming the treated bottom ash sand. For example, the sized bottom ash material is preferably ¼ inch and smaller with 90% passing a #4 sieve. Fractions larger than ¼ inch may be crushed to comply with size requirements. In another embodiment, the maximum aggregate size of the bottom ash material passes a ⅜-inch sieve opening with less than 15 wt % retained on a #4 sieve. In addition, for the fines of the bottom ash material, less than 25 wt % of the bottom ash material passes a #100 sieve opening.

Further shown in FIG. 1, the pretreatment process 100 further provides that the sized material from the density separation system 103 is provided to a rinse/wash system 105 to wash deleterious materials from the bottom ash. Rinse/wash system 105 and density separation system 103 may be combined into a single unit, for example, utilizing a watering box, sand screw and screen arrangement. The rinse/wash system 105 may include a large basin with sand screws incorporated into the bottom of a basin of the rinse/wash system 105. The basin is filled with water and has adjustable weir plates to control particulate separation. The heavy fine fraction drops to the bottom of the basin and is collected by the sand screws and discharges the plant as reclaimed bottom ash sand. The very fine material passes over the weir plates and is discharged out of the system. The particle size passing the weirs can be controlled by a counter current underflow system. The rinse/wash system 105 is operated to remove low density, for example, less than 1 gram/cm$^3$, particles. The remaining reclaimed bottom ash sand has a specific gravity of 1.0 or greater. The sized and washed reclaimed bottom ash is discharged to reclaimed bottom ash storage 107.

The reclaimed bottom ash sand formed from the pretreatment system 100 is not suitable for use in structural concrete. For example, the reclaimed bottom ash sand may include, but is not limited to, greater than about 0.5 wt %, or greater than about 1.0 wt %, or greater than about 1.5 wt %, or greater than about 2.0 wt %, or from about 5 wt % or from about 6 wt %, or from about 0.5 to about 15.0 wt %, or from about 1.0 to about 12.0 wt %, or from about 5.0 to about 10.0 wt %, or about 6.0 wt % reactive aluminum. The aluminum in the bottom ash material includes compounds such as $Al_2O_3$ (aluminum oxide), AlOOH (boehmite) and elemental or metallic Al. The chemical makeup of the reactive aluminum and its concentration in the reclaimed bottom ash is undesirable for its reactivity to form hydrogen gas, particularly when utilized in structural concrete.

The reclaimed bottom ash sand for use in the method, according to the present invention, includes little or no material with a specific gravity less than 1.0 or proven by testing to be hard, durable and non-reactive/inert fine aggregate. In addition, the reclaimed bottom ash includes little or no unburnt material, for example, paper, wood, or deleterious plastics. The maximum aggregate size of the reclaimed bottom ash pass a ⅜-inch sieve opening with less than 15 wt % retained on a #4 sieve. In addition, the reclaimed bottom ash includes a particle size of less than 25 wt % passing a #100 sieve opening and less than 5 wt % passing a #200 sieve opening. The reclaimed bottom ash includes moisture content of less than 25 wt %, or less than 20 wt %, or less than 15 wt %, or preferably less than 10 wt %. The reclaimed bottom ash includes less than 5 wt % or less than 4 wt %, or less than 3 wt % glassy material.

In one embodiment, the reclaimed bottom ash sand includes a chemical makeup of either preferred, more preferred or most preferred reclaimed bottom ash material in TABLE 1:

TABLE 1

| Constituents | Preferred Total (mg/kg) | More Preferred Total (mg/kg) | More Preferred Leachable (mg/L) | Most Preferred Total (mg/kg) | Most Preferred Leachable (mg/L) |
| --- | --- | --- | --- | --- | --- |
| Inorganics | | | | | |
| Aluminum | 190,000 | 190,000 | 5.0 | 190,000 | 0.1 |
| Antimony | 6.75 | 88 | 0.15 | 88 | 0.006 |
| Arsenic | 29 | 29 | 0.25 | 29 | 0.05 |
| Barium | 1,000 | 15,000 | 50 | 15,000 | 2 |
| Beryllium | 2.3 | 440 | 0.1 | 440 | 0.004 |
| Cadmium | 2.5 | 47 | 0.125 | 47 | 0.005 |
| Chloride | — | — | 250 | — | 250 |
| Copper | 8,200 | 8.200 | 25 | 1,500 | 1 |
| Fluoride | — | — | 4 | — | 4 |
| Iron | 66,000 | 66,000 | 7.5 | 66,000 | 0.3 |
| Lead | 112.5 | 500 | 0.375 | 500 | 0.015 |
| Manganese | 31,000 | 31,000 | 2.5 | 31,000 | 0.1 |
| Mercury | 1 | 66 | 0.05 | 66 | 0.002 |
| Nickel | 50 | 4,400 | 2.5 | 4,400 | 0.1 |
| Nitrate | — | — | 10 | — | 10 |
| Nitrite | — | — | 1 | — | 1 |
| Selenium | 25 | 1,100 | 1 | 1,100 | 0.05 |
| Silver | 50 | 1,100 | 2.5 | 1,100 | 0.01 |
| Sulfate | — | — | 500 | — | 500 |
| Thallium | 2.2 | 15 | 0.0125 | 15 | 0.002 |
| Zinc | 1,000 | 66,000 | 50 | 66,000 | 2 |
| pH (standard units) | 5.5-11.5 | 5.5-11.5 | — | 5.5-11.5 | — |

TABLE 1-continued

| Constituents | Preferred Total (mg/kg) | More Preferred Total (mg/kg) | More Preferred Leachable (mg/L) | Most Preferred Total (mg/kg) | Most Preferred Leachable (mg/L) |
|---|---|---|---|---|---|
| Organics | | | | | |
| Benzene | 1.7 | 41 | 0.005 | 41 | 0.005 |
| Carbon Tetrachloride | 2.1 | 21 | 0.005 | 21 | 0.005 |
| O-Dichlorobenzene | 2.7 | 260 | 0.6 | 260 | 0.6 |
| para-Dichlorobenzene | 1.8 | 210 | 0.075 | 210 | 0.075 |
| 1,2-Dichloroethane | 2.8 | 12 | 0.005 | 12 | 0.005 |
| 1,1-Dichloroethene | 3.1 | 200 | 0.027 | 200 | 0.027 |
| Cis-1,2-Dichloroethylene | 2.5 | 670 | 0.007 | 670 | 0.007 |
| Trans-1,2-Dichloroethylene | 3.4 | 1,300 | 0.07 | 1,300 | 0.07 |
| Dichloromethane | 2.6 | 680 | 0.005 | 680 | 0.005 |
| 1,2-Dichloropropane | 1.9 | 31 | 0.005 | 31 | 0.005 |
| Ethylbenzene | 2.1 | 180 | 0.7 | 180 | 0.7 |
| Monochlorobenzene | 2.3 | 490 | 0.1 | 490 | 0.1 |
| Styrene | 5 | 1,400 | 0.1 | 1,400 | 0.1 |
| Tetrachloroethene | 1.5 | 240 | 0.005 | 240 | 0.005 |
| Toluene | 2.4 | 350 | 1.0 | 350 | 1.0 |
| 1,2,4-Trichlorobenzene | 2.8 | 340 | 0.07 | 340 | 0.07 |
| 1,1,1-Trichloroethane | 2.7 | 750 | 0.2 | 750 | 0.2 |
| 1,1,2-Trichloroethane | 3 | 20 | 0.003 | 20 | 0.003 |
| Trichloroethene | 1.8 | 190 | 0.005 | 190 | 0.005 |
| Vinyl Chloride | 0.69 | 12 | 0.002 | 12 | 0.002 |
| Xylenes | 19 | 310 | 10 | 310 | 10 |
| Atrazine | 0.56 | 46 | 0.003 | 46 | 0.003 |
| Benzo(a)pyrene | 1.3 | 2.5 | 0.0002 | 2.5 | 0.0002 |
| Chlordane | 1.8 | 28 | 0.002 | 28 | 0.002 |
| 2,4-D (Dichloro-phenoxyacetic acid) | 1.2 | 200 | 0.07 | 200 | 0.07 |
| Dalapon | 39 | 2,000 | 0.2 | 2,000 | 0.2 |
| Dibromo-chloropropane | 0.47 | 3.8 | 0.0002 | 3.8 | 0.0002 |
| Di (2-ethylhexyl) Adipate | 10,000 | 10,000 | 0.4 | 10,000 | 0.4 |
| Dinoseb | 0.47 | 30 | 0.007 | 30 | 0.007 |
| Endrin | 0.58 | 13 | 0.002 | 13 | 0.002 |
| Ethylene Dibromide | 0.14 | 0.21 | 0.00005 | 0.21 | 0.00005 |
| Heptachlor | 0.27 | 4 | 0.0004 | 4 | 0.0004 |
| Heptachlor Epoxide | 0.37 | 2 | 0.0002 | 2 | 0.0002 |
| Hexachlorobenzene | 0.055 | 0.15 | 0.001 | 0.15 | 0.001 |
| Hexachloro-cyclopentadiene | 2.9 | 66 | 0.05 | 66 | 0.05 |
| Lindane | 0.34 | 14 | 0.0002 | 14 | 0.0002 |
| Methoxychlor | 13 | 15 | 0.0004 | 15 | 0.0004 |
| PCBs | 2 | 2 | — | 2 | — |
| Pentachlorophenol | 2.1 | 150 | 0.001 | 150 | 0.001 |
| Toxaphene | 0.53 | 16 | 0.002 | 16 | 0.002 |
| 2,4,5-TP | 4.9 | 1,200 | 0.05 | 1,200 | 0.05 |

Figure 2:
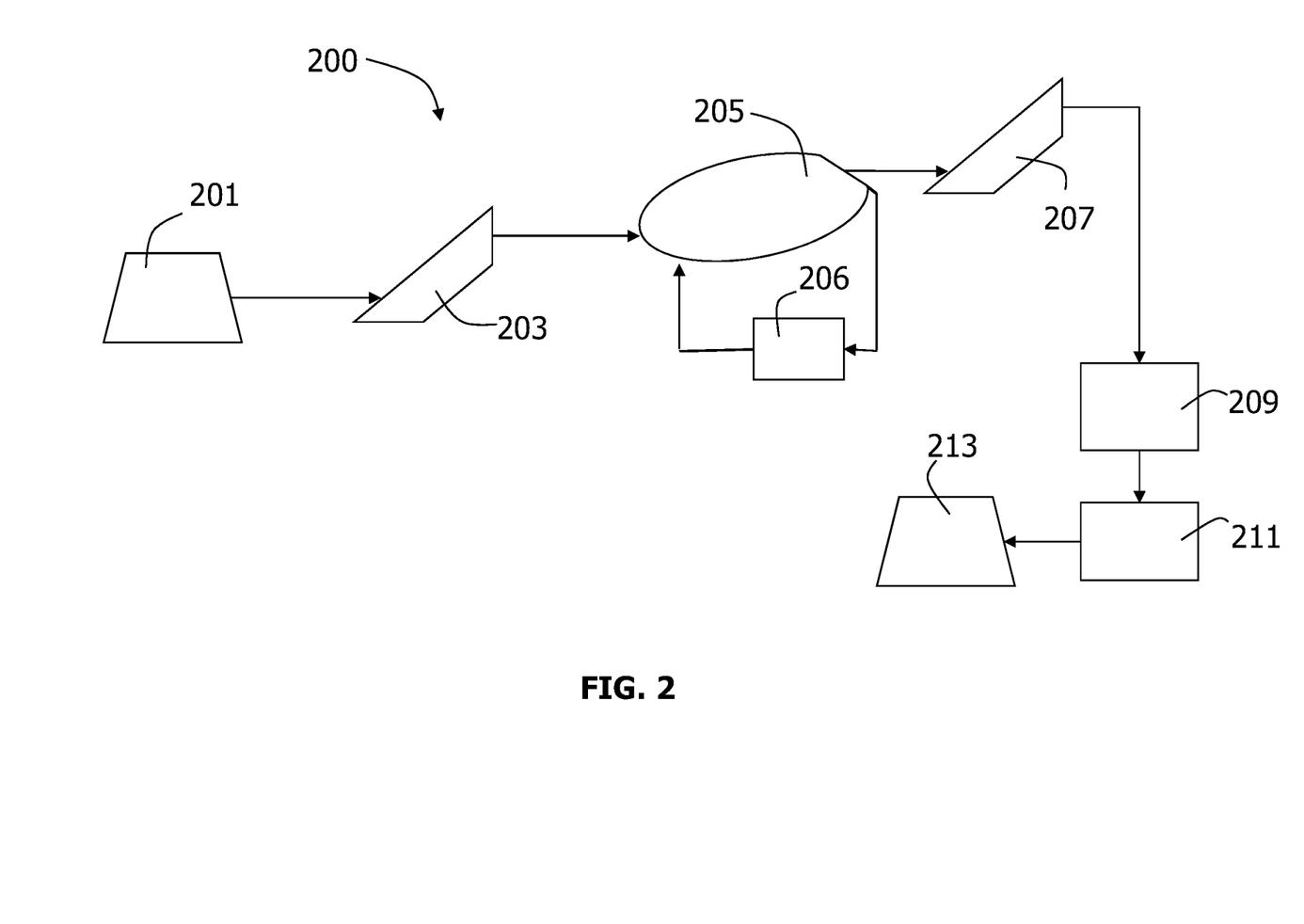
FIG. 2 shows a schematic view of a system for producing treated reclaimed bottom ash sand, according to an embodiment of the present invention.

FIG. 2 schematically shows a treatment system 200 for forming treated reclaimed bottom ash sands from reclaimed bottom ash sand. Reclaimed bottom ash sand source 201 includes reclaimed bottom ash sand, having the composition described above, either provided from the pretreatment system 100 or other suitable source. Optional lightweight residue removal system 203 may be provided to remove lightweight residues, such as fly ash. The lightweight residue removal system 203 may be utilized in the event that material from reclaimed bottom ash sand source 201 includes an undesirable amount of lightweight fine material or material having a specific gravity less than 1.0. For example, the lightweight residue removal system 203 may be utilized when the material fed to the process includes greater than 5 wt % finer than #200 sieve or less than 75 μm (i.e., material passing through a #200 sieve). For example, this material may be either cake or fly ash which are quite sticky and therefore difficult to remove. Suitable equipment for the lightweight residue removal system 203 may include a sand screw. For example, the lightweight residue removal system 203 may include a large basin with sand screws incorporated in the bottom. The basin is filled with water and has adjustable weir plates to control particulate separation. The heavy fine fraction drops to the bottom of the basin and is collected by the sand screws and discharges the plant as reclaimed bottom ash sand. The very fine material passes over the weir plates and is discharged out of the system. The particle size passing the weirs can be controlled by a counter current underflow system. The lightweight residue removal system 203 is operated to remove low density, for example, less than 1 gram/cm³, particles. The remaining reclaimed bottom ash sand has a specific gravity of 1.0 or greater. The material with the residue removed is discharged to reaction vessel 205.

Figure 4:
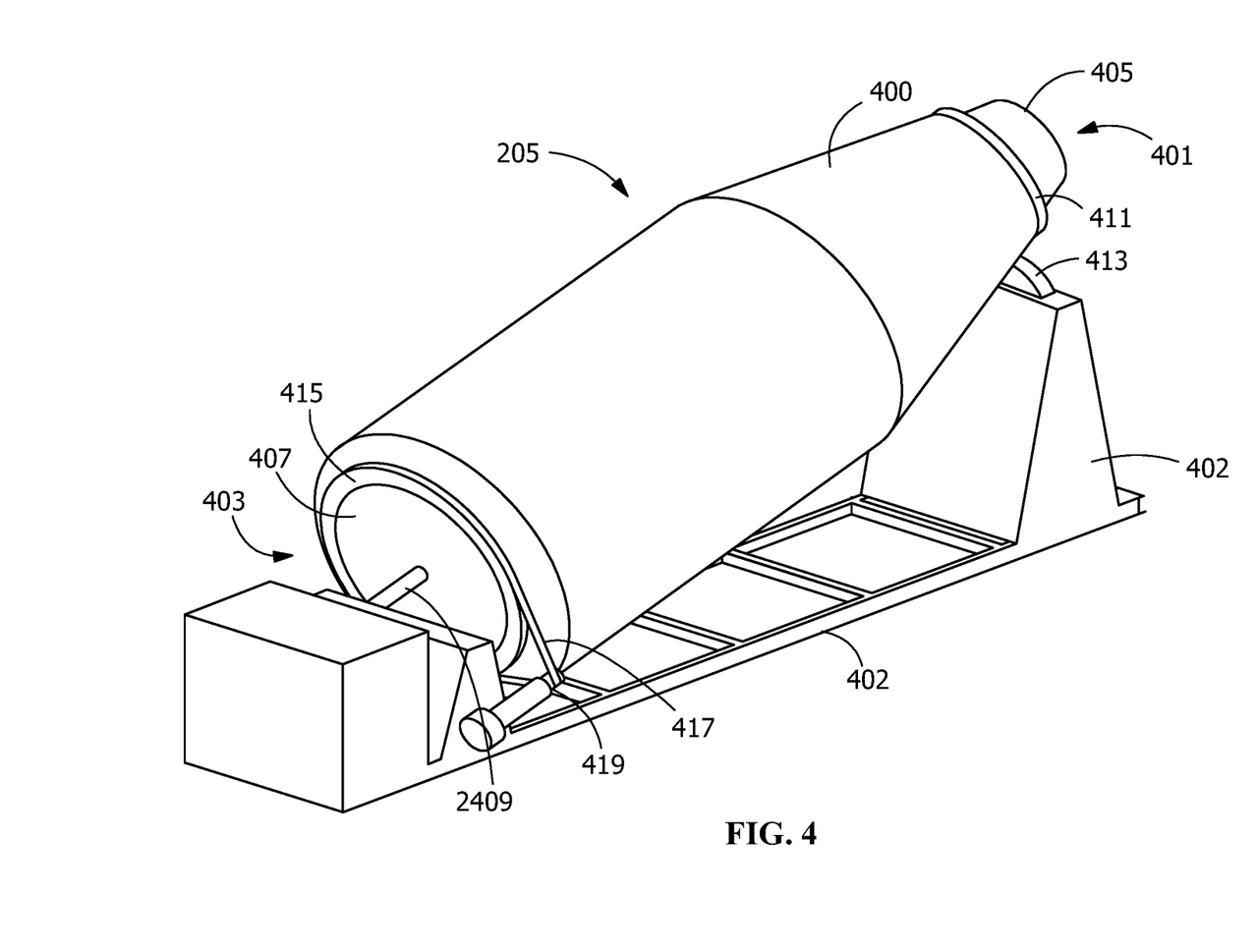
FIG. 4 shows a treatment vessel for forming the treated reclaimed bottom ash sand, according to an embodiment of the present invention.

Further, as shown in FIG. 2, the treatment system 200, the reaction vessel 205 wherein the temperature and agitation rate may be controlled throughout the length of the treatment (see also FIG. 4). System 200 further includes a charge vessel 206 for providing heated sodium hydroxide (NaOH) in aqueous solution for use as a catalyst within the reaction vessel 205. In addition, charge vessel 206 may include heat exchangers and/or screens or filters to deliver heated aqueous NaOH solutions to the reaction vessel 205. The heat exchangers may be any suitable known heat exchange device suitable for heating aqueous NaOH solutions. The NaOH solution is charged to the reaction vessel 205 to maintain a flow of reactant in the reaction vessel 205. Suitable concentrations of the NaOH include, but are not limited to, 0.5 to 3.0 Molar or 0.75 to 1.5 Molar, or preferably 1.0 Molar. In one embodiment, the NaOH solution is preheated to reduce the energy needed to heat the entire system and speed up the overall reaction rate. The temperature of the reaction is preferably controlled by flow rate of the NaOH solution from charge vessel 206. While not wishing to be bound by theory or explanation, it is believed that the kinetics of the reaction are best suited at elevated temperatures with increased agitation. Suitable temperatures for the process include 40 to 70 degrees Celsius, 50 to 60 degrees Celsius or 55 degrees Celsius. In one embodiment, the reaction is performed for a time for at least 4 hours, or from about 4 to 8 hours, or from about 4 to 6 hours, or about 5 hours. The reaction is preferably conducted for sufficient time to completely or substantially completely react the reactive Al to prevent any further hydrogen production which can interfere with the matrix of the cement paste formed with the treated material. It may be impossible to completely stop the reaction, but the process slows the reaction rate to a level in which the hydrogen gas formation has no effect on the cement matrix. The $Al_2O_3$ is broken down from the free sodium ions in the solution allowing the solution to access the elemental aluminum. Hydrogen gas evolves from the reaction and can be captured for reuse or destroyed. The captured hydrogen gas may be utilized in the process of preheating the NaOH. In one embodiment, gallium or indium metal or compounds may be provided for the purpose of additional catalyzation of the reaction. In the instance where gallium or indium is utilized, additional separation of gallium and indium is needed since both would be in liquid form at the reaction temperatures. In other embodiments, agitation assistance structures, such as steel balls, may be added to the reactor to increase agitation.

Once this material undergoes treatment in the reaction vessel 205, the NaOH solution will be recovered and sent through a filtering process for reuse via charge vessel 206. In one embodiment, a screen or filter is provided to remove fine material from the aqueous NaOH solution, which is removed from the system.

FIG. 2 further shows a rinse system 207, wherein the reclaimed bottom ash sands are rinsed and screened to remove small particles, for example, particles with densities less than 1.0 g/cm³ resulting from the treatment or lack of pre-processing by the supplier of the feedstock. Another benefit of the system is the ability to remove organics. NaOH is well known to decompose organic matter. There are, however, fractions of stable hydrocarbons, such as small plastics, in the waste stream. While not wishing to be bound by theory or explanation, it is believed that there is no loss in compression strength due to the presence of stable hydrocarbons and they may provide a benefit via dampening and impact resistance.

As shown in FIG. 2, the reacted and rinse material is then run through a magnetic separator 209, such as a drum magnet separator, belt magnet, or other known ferrous material separator, to remove ferrous components, such as iron. Greater amounts of iron are removed in the magnetic separator 209 from the material treated in the reactor vessel 205 than can be removed from material that is not treated in reactor vessel 205. In addition, the material is, optionally, run through an eddy current separator 211, such as a high frequency eddy current separator, to remove any metallic non-ferrous particles. The treated reclaimed bottom ash sand is discharged to treated reclaimed bottom ash sand storage 213. Treated reclaimed bottom ash sand may be further rinsed thoroughly and decanted prior to transport.

Figure 3:
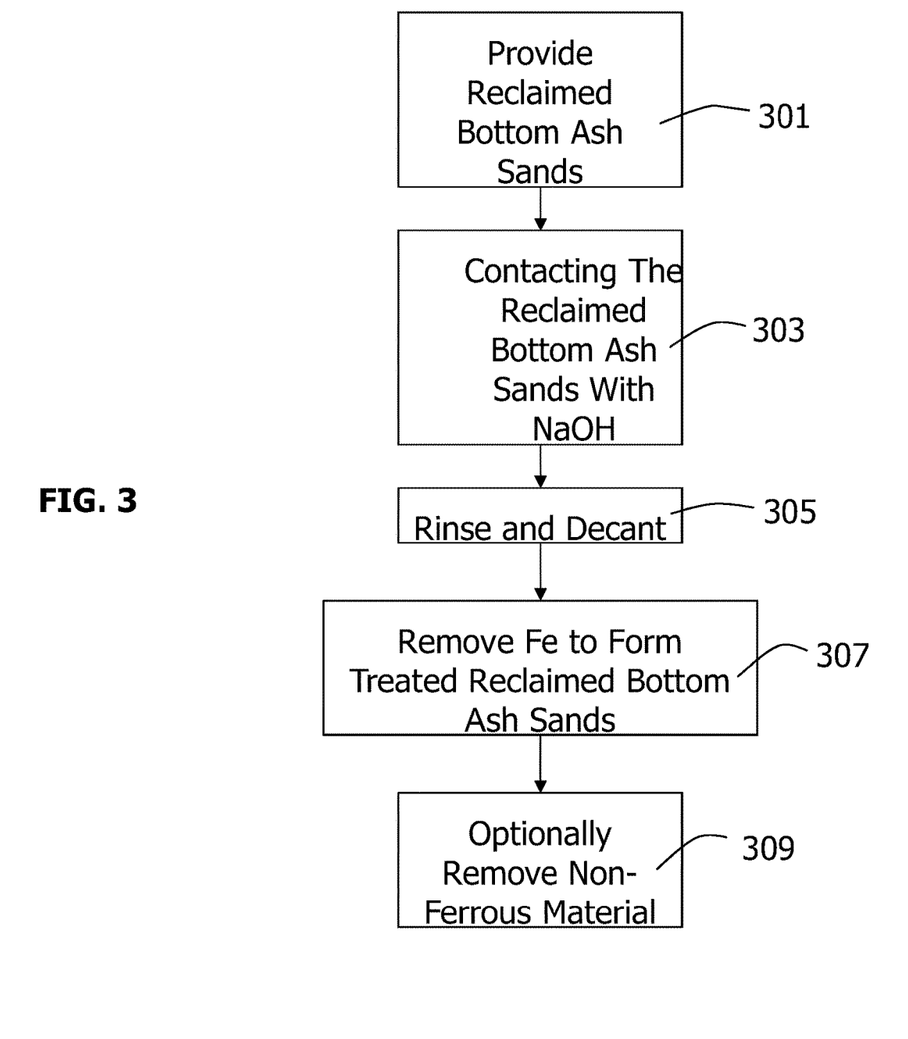
FIG. 3 shows a method for forming a treated reclaimed bottom ash sand, according to an embodiment of the present invention.

FIG. 3 shows a flow diagram illustrating a method for forming a treated reclaimed bottom ash sand, according to the present invention. As described in the system above with respect to FIG. 2, the method includes providing reclaimed bottom ash sand (box 301). The method further includes contacting the reclaimed bottom ash sand with an aqueous composition comprising 0.5 to 3.0M NaOH for a time greater than about 4 hours to form a reduced metallic aluminum reclaimed bottom ash sand (box 303). The contacting includes placing the material into a reaction chamber where NaOH will be added to catalyze the reaction. This reaction vessel is able to create agitation, add heat to the system, and optionally capture evolved hydrogen gas or vent it away safely. The material will spend 4 to 8 hours in this treatment to, for example, ensure the free Al is reacted to form $Al(OH)_3$, which is an aqueous product carried away with the solvent. In addition, the iron will be reduced to allow for easier/more efficient removal. The method further includes rinsing and decanting the reduced metallic aluminum reclaimed bottom ash sand (box 305). The method furthest includes removing iron from the rinsed and decanted reduced metallic aluminum reclaimed bottom ash sand to less than 5.0 wt % iron (box 307). The method may further optionally include removal of nonferrous material (box 309). The removal of the iron forms the treated reclaimed bottom ash sand having reduced hydrogen formation in concrete compared to the hydrogen formation of concrete utilizing reclaimed bottom ash sand.

The treated reclaimed bottom ash sand made by the process, according to the present invention, includes primarily of calcium carbonate and silica having less than 5% reactive aluminum, less than 5 wt % iron, less than 3 wt % friable particles, less than 5 wt % material with specific gravity less than 1.0, less than 5 wt % treated reclaimed bottom ash sand passing #200 sieve, and greater than 85 wt % treated reclaimed bottom ash sand passing #4 sieve. In other embodiments, the treated reclaimed bottom ash sand includes less than 4 wt % or less than 3 wt % or less than 2 wt % or less than 1 wt % or less than 0.5 wt % reactive aluminum. In other embodiments, the treated reclaimed bottom ash sand includes less than 4 wt % or less than 3 wt % or less than 2 wt % or less than 1 wt % or less than 0.5 wt % iron. In other embodiments, the treated reclaimed bottom ash sand includes less than 2.5 wt % or less than 2.0 wt % or less than 1 wt % or less than 0.5 wt % or less than 0.25 wt % friable particles. In other embodiments, the treated reclaimed bottom ash sand includes less than 4 wt % or less than 3 wt % or less than 2 wt % or less than 1 wt % or less than 0.5 wt % material with specific gravity less than 1.0. In other embodiments, the treated reclaimed bottom ash sand includes less than 4 wt % or less than 3 wt % or less than 2 wt % or less than 1 wt % or less than 0.5 wt % treated reclaimed bottom ash sand passing #200 sieve. In other embodiments, the treated reclaimed bottom ash sand includes greater than 90 wt % or greater than 95 wt % or greater than 98 wt % treated reclaimed bottom ash sand passing #4 sieve. Further, embodiments according to the present invention include treated reclaimed bottom ash sand that is free of organic impurities registering a value of less than 14 on the Gardiner color wheel or #3 on the organic plate and produce a stain index of less than 60 on ASTM C641. The treated reclaimed bottom ash composition and properties will vary based upon the bottom ash feedstock and source of the bottom ash. The treated reclaimed bottom ash sand may be blended or otherwise mixed with other treated reclaimed bottom ash sand to meet one or more of the above properties.

Treated reclaimed bottom ash material, according to the present disclosure, includes material that is capable of meeting ASTM standards for use as an aggregate for concrete. For example, treated reclaimed bottom ash material, according to an embodiment of the present invention, complies with ASTM Standard Specification for Lightweight Aggregate for Internal Curing of Concrete C1761 (July 2017) (ASTM C1761), which provides guidelines to estimate the amount of lightweight aggregate required for internal curing per unit volume of concrete. For example, treated reclaimed bottom ash material, according to an embodiment of the present invention, complies with ASTM Standard Specification for Concrete Aggregates C33 (April 2018) (ASTM C33), which provides guidelines for the grading and quality of the fine and coarse aggregate for use in concrete. For example, treated reclaimed bottom ash material, according to an embodiment of the present invention, complies with ASTM Standard Specification for Lightweight Aggregates for Structural Concrete C330 (July 2017) (ASTM C330), which provides guidelines for lightweight aggregate for reducing density of concrete while maintaining the compressive strength. For example, treated reclaimed bottom ash material, according to an embodiment of the present invention, complies with ASTM Standard Specification for Lightweight Aggregates for Concrete Masonry Units (July 2017) (ASTM C331), which provides guidelines for lightweight aggregates intended for use in concrete masonry units with a primary consideration to reduce the density of the concrete masonry units.

In one embodiment, bottom ash formed from the York County Solid Waste Authority, York, PA and treated with the process, according to the present disclosure, conforms to ASTM C1761 with the following exceptions, in the method of manufacture, loss on ignition which requires the material to have less than 5% deleterious carbon and less very fines. Although the treated reclaimed bottom ash sand may test outside ASTM C1761, the material does not contain deleterious carbon and, therefore is suitable for use as a fine aggregate for structural concrete. The loss on ignition material, instead, is stable plastic hydrocarbons that are affected by high heat. Due to the process, according to the present invention, there may be less very fines which pass a #50 sieve than is recommended by the standard. Using the treated reclaimed bottom ash sand in a blended manner offsets this by total gradation of the fine aggregate. While not directly falling within the ASTM C1761 standard, the lack of the very fine material will enhance the internal curing of the concrete when the treated reclaimed bottom ash sand is utilized.

In another embodiment, the treated reclaimed bottom ash material may be graded for use in structural concrete, wherein the treated reclaimed bottom ash sand includes the following particle sizes. Exemplary treated reclaimed bottom ash sand includes percent passing sieve sized (ASTM Standard Specification for Woven Wire Test Sieve Cloth and Test Sieves E11 (ASTM E11)(2017)):

9.5-mm (⅜-in.) 100 wt %
4.75-mm (No. 4) 95 to 100 wt %
2.36-mm (No. 8) 80 to 100 wt %
1.18-mm (No. 16) 50 to 85 wt %
600-μm (No. 30) 25 to 60 wt %
300-μm (No. 50) 5 to 30 wt %
150-μm (No. 100) 0 to 10 wt %
75-μm (No. 200) 0 to 3.0 wt %

For concrete not subject to abrasion, material finer than the 75-μm (No. 200) sieve is less than 5.0 wt %. For manufactured fine or other recycled aggregate, if the material finer than the 75-μm (No. 200) sieve consists of the dust of fracture, essentially free of clay or shale, material finder than the 75-μm (No. 200) sieve is less than 5.0 wt % for concrete subject to abrasion, and less than 7 wt % for concrete not subject to abrasion.

The treated reclaimed bottom ash material includes less than 3 wt % or less than 2 wt % or less than 1 wt % friable particles. Friable particles are removed utilizing the washing/rinsing steps. Ultra-fines and clays are broken down and removed with the overflow while the process is charging.

The treated reclaimed bottom ash material includes fine aggregate subjected to five cycles of the soundness test shall have a weighted average loss less than 10 wt % when sodium sulfate is used or 15 wt % when magnesium sulfate is used.

In certain embodiments according to the present disclosure, depending upon the loss on ignition values of the treated reclaimed bottom ash sands, the treated reclaimed bottom ash sand may be utilized as an aggregate having internal curing properties. For example, the final treated reclaimed bottom ash sand (recycled fine aggregate) may provide properties of an internal curing aggregate with a very high absorption capacity. The treated reclaimed bottom ash sands may include a 20 to 30% or 22 to 28% or about 25% absorption, suitable for use in concrete. The addition of this material to concrete reduces shrinkage and improves freeze thaw performance. In certain embodiments, according to the present disclosure, the treated reclaimed bottom ash sands form concrete subjected to freezing and thawing tests meeting test method ASTM Standard Test Method for Resistance of Concrete to Rapid Freezing and Thawing C666/C666M (ASTM C666/C666M (2015)). The process according to the present invention increase the sustainable life span of the structures by reducing permeability. A water/viscosity modifier solution may be added to the treated reclaimed bottom ash sand to reduce or eliminate separation of the individual components and reduce permeability. Suitable examples of water/viscosity modifier solutions include, but are not limited to, V-MAR® F10 concrete rheology-modifying admixture ASTM C494 Type S.

In addition, this treated reclaimed bottom ash sand can be further classified into lightweight or normal weight. If the absorption and desorption values are sufficient, the lightweight material can be further classified to internal curing.

FIG. 4 shows an exemplary reaction vessel 205, according to an embodiment of the present disclosure. As shown in the embodiment shown in FIG. 4, the reaction vessel 205 includes a drum 400 having a dry product charging end 401 and a wet product charging end 403. Drum 400 is mounted on a front and rear support pedestal 402. Pedestal 402 may be fabricated using ¼ inch and ⅜ inch 112,000 psi tensile steel with heavy duty I and/or W beam frame connecting pedestals. Reaction vessel 205 receives reclaimed bottom ash sands in the dry product charging end 401 wherein the distal end of the drum 400 includes a head 407 that is mounted about a trunnion shaft 409. In one embodiment, drum 400 is formed from ¼ inch thick carbon steel on the drum shell and 5/16 inch thick carbon steel on the head 407 with a trunnion shaft 409. In one embodiment, drum 400 includes two rows (auger style) of 3/16 inch mixing fins with pressed lip built into the blade. Each row will include weep holes to allow solution to remain in the drums as the product is discharged. Drum 400 includes oversized discharge flange opening with an additional drip ring on the discharge end. The rows in drum 400 are arranged and disposed to provide agitation when rotated in a first direction wherein the dry product, such as the reclaimed bottom ash sand, is retained and agitated within the drum 400. In addition, the rows in drum 400 are arranged and disposed to provide discharge of the dry product, such as the treated reclaimed bottom ash sand, from the drum 400.

The wet product charging end 403 having the trunnion shaft 409 includes a charging conduit therein for charging wet material, including aqueous compositions having from about 0.5 to 3.0 M NaOH to the drum 400. Consistent aqueous solution input into the drum 400 through the head 407 in order to flood drum volume causing the aqueous solution including the NaOH to overflow out the dry product charging end 401. In one embodiment, as shown in FIG. 2, during the mixing process the overflowed solution will be collected and piped a charge vessel (see charge vessel 206 in FIG. 2) for reheating before reintroduction into the drum through trunnion shaft 409 going into the head 407 of drum 400. In one suitable embodiment of the method, according to the invention, drum 400 during mixing should be at 55° C. (131° F.) and the injected aqueous NaOH solution will be 60° C. (140° F.).

Drum 400, as shown in FIG. 4, includes a solid steel roller track 411 welded to the dry product charging end 401. Drum rollers 413 including, in certain embodiments, double sealed, tapered bearings, with easy to reach grease points. For example, drum roller surfaces may be hardened to 560-654 Brinell with roller adjustments on one-piece machined brackets. At the distal end of drum 400 at head 407, a sprocket 415 is mounted on drum 400 to facilitate rotation of drum via a drive mechanism 417, such as a chain or belt, driven by motor 419. For example, motor 419 may include a 75 HP SEW Eurodrive helical gear motor. For example, drum 400, during the method of the present invention, may be rotated at 5 rpm over 6 hrs or about 1800 rotations per shift with estimated throughput of about 25 tons of product/ash per 8 hours per machine. Rotational speed may be controlled using a VFD with a range of 0 RPM to 10 RPM mounted in an enclosed box at the front of the mixer system. During discharge (i.e., when rotated in the discharge direction), the rate or rotation is slow and controlled as material is being fed into a screw conveyor AND to allow the solution to remain in the drum as products are pushed out. After the material has completed this treatment cycle, it will be evacuated from the treatment drum by manner of fins which will propel the material out of the drum in a discharging manner. This treated material will be rinsed and then run through a magnetic separator to remove any unwanted ferrous sand.

The treated reclaimed bottom ash sands may be saturated as required and used as fine aggregate replacement by volume.

Another embodiment, according to the present invention, includes a structural concrete formed utilizing the treated reclaimed bottom ash sand as at least a portion of the fine aggregate portion of the concrete. The structural concrete composition includes i) cement, ii) a fine aggregate including virgin material and treated reclaimed bottom ash sand, iii) a natural coarse aggregate, and iv) water. Suitable cement material for use in the concrete includes, but is not limited to, Portland cement or other cementitious materials, including cementitious materials including pozzolans. Suitable fine virgin aggregate material for use in the concrete includes, but is not limited to, sand or other fine aggregates known for use in concrete, including those conforming with local standards. Suitable coarse aggregate material for use in the concrete includes, but is not limited to, gravel, crushed stone, crushed granite, and other coarse aggregates known for use in concrete, including those conforming to local standards. The concrete may include reinforcing structures, such as rebar, and additional additives, such as pozzolans or superplasticizers.

Other embodiments of the present disclosure include a method for producing a cast concrete product comprising the structural lightweight concrete composition. The method includes i) mixing cement, fine aggregate including virgin material and treated reclaimed bottom ash sand, the natural coarse aggregate, to form a solid cement mixture, ii) water is added to the cement mixture to affect hydraulic setting to produce a concrete product.

The concrete includes fine aggregate having various ratios of virgin material, such as sand, to treated reclaimed bottom ash sand. Suitable ratios include from about 10 vol % to about 50 vol % water saturated treated reclaimed bottom ash sand, balance virgin material or 90 vol % virgin material to 10 vol % water saturated treated reclaimed bottom ash sand, 85 vol % virgin material to 15 vol % water saturated treated reclaimed bottom ash sand, 80 vol % virgin material to 20 vol % water saturated treated reclaimed bottom ash sand, 75 vol % virgin material to 25 vol % water saturated treated reclaimed bottom ash sand, 50 vol % virgin material to 50 vol % water saturated treated reclaimed bottom ash sand. In another embodiment, the ratio of fine aggregate is about 27 vol % of water saturated treated reclaimed bottom ash sand having 10 wt % to 25 wt % water, or water saturated treated reclaimed bottom ash sand having 10 wt % water, or water saturated treated reclaimed bottom ash sand having 15 wt % water, or water saturated treated reclaimed bottom ash sand having 20 wt % water, or water saturated treated reclaimed bottom ash sand having 25 wt % water, balance virgin fine aggregate. In another embodiment, the ratio of fine aggregate is about 22.5 vol % of water saturated treated reclaimed bottom ash sand having 10 wt % to 25 wt % water, or water saturated treated reclaimed bottom ash sand having 10 wt % water, or water saturated treated reclaimed bottom ash sand having 15 wt % water, or water saturated treated reclaimed bottom ash sand having 20 wt % water, or water saturated treated reclaimed bottom ash sand having 25 wt % water, balance virgin fine aggregate. The concrete according to the present invention results in a compressive strength that is equal to or greater than the compressive strength of the same concrete composition with 100 wt % virgin material. In other embodiments, the concrete, according to the present invention, includes compressive strength that is at least 1% greater, at least 2% greater, at least 4% greater, or at least 5% greater than the compressive strength of the same concrete composition with 100 wt % virgin material. In addition, the concrete according to the present invention results in a compressive strength that is equal to or greater than the compressive strength of the same concrete composition with 90 or 80 or 70 wt % virgin material with 10 or 20 or 30 wt % reclaimed bottom ash sand. In other embodiments, the concrete, according to the present invention, includes compressive strength that is at least 5% greater, at least 10% greater, at least 15% greater, or at least 20% greater than the compressive strength of the same concrete composition with 10 or 20 or 30 wt % reclaimed bottom ash sand, balance virgin material.

EXAMPLES

Raw MSWI Ash is bottom ash obtained from York County Solid Waste Authority, York, PA. Reclaimed Sands were obtained from Pure Recovery Group, Emigsville, PA, which includes rinsed and sized Raw MSWI Ash. Obtained bottom ash material which has been classified through a gradation separation process and washed or other process to remove low density (less than 1 gram/cm$^3$) particles. The latter can be obtained through a gravity separation treatment or a wash gradation or a combination of both. The properties of these materials are shown in TABLE 2.

The treated reclaimed bottom ash sand described in TABLE 2 was obtained by treating the reclaimed bottom ash sand from Pure Recovery Group with 1 M NaOH is a small concrete mixer at 50 degrees Celsius for 8 hours. The treated material was then washed and decanted.

TABLE 2

| Material | Bulk Density lb/ft$^3$ | Specific Gravity | Absorption Capacity (%) | Void Content (%) |
|---|---|---|---|---|
| Raw MSWI Bottom Ash | 49 | 1.44 | 27.7 | 45.3 |
| Reclaimed Bottom Ash Sands | 58 | 1.31 | 29 | 29 |
| Treated Reclaimed Bottom Ash Sand | 54 | 1.41 | 31.7 | 38 |

Concrete was prepared utilizing a mix of Portland concrete, crushed stone aggregate, fine aggregate, which was varied in composition, and water. The concrete was formed in a concrete mixer and permitted to cure where the compressive strength was measured.

Figure 5:
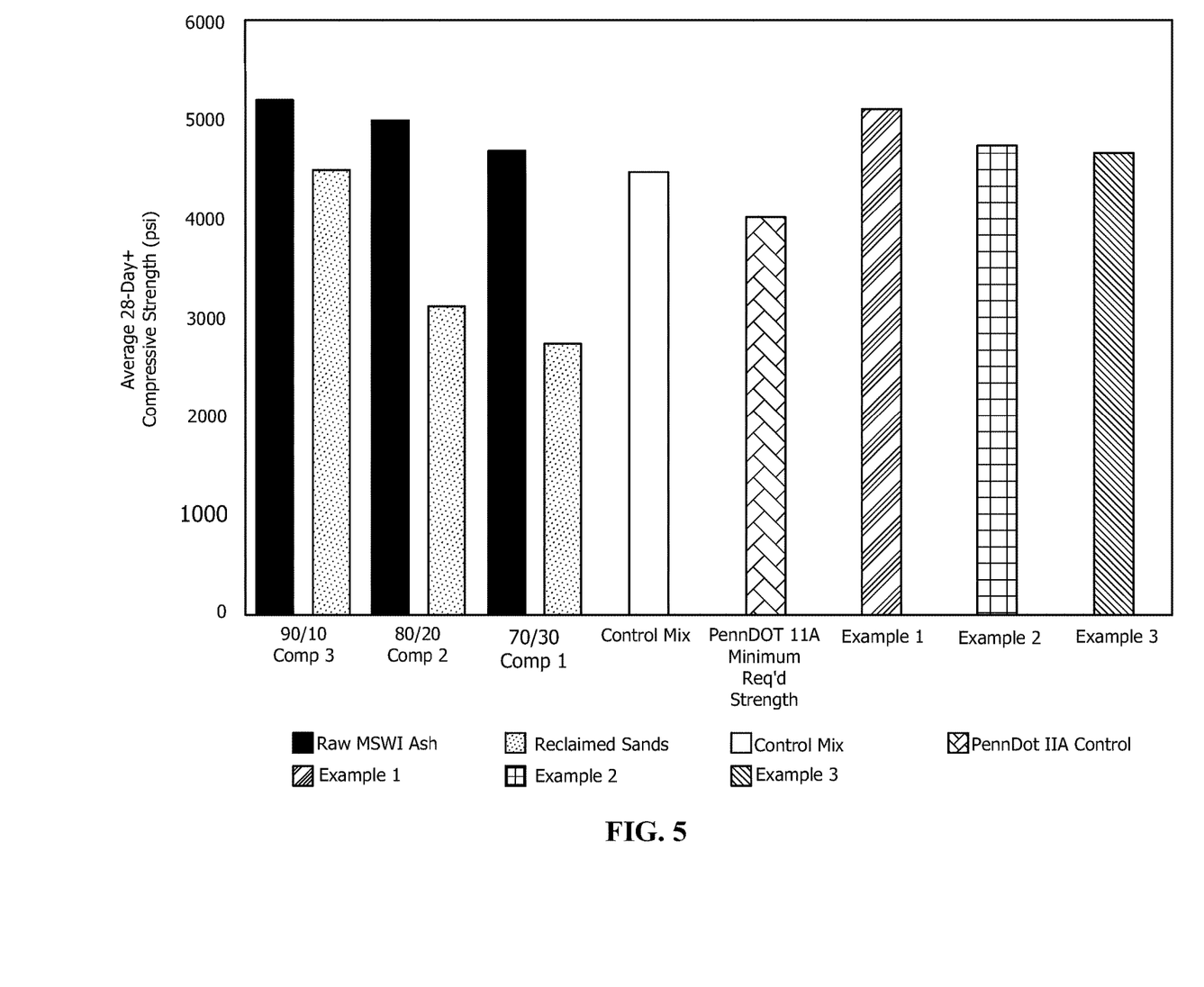
FIG. 5 shows a graph displaying comparative concrete strength values for bottom ash, reclaimed bottom ash sand and treated reclaimed bottom ash sand.

FIG. 5 shows values of average 28-day compressive strength for various mixes for concrete including both the inclusion of a comparative partial replacement utilizing reclaimed bottom ash sand and an inventive partial replacement utilizing treated reclaimed bottom ash sand according to the present invention. The data compares concrete samples that were formed with fine aggregates including "Raw MSWI Ash" (i.e., Bottom Ash obtained from York County Solid Waste Authority, York, PA), "Reclaimed Sands" (i.e., Reclaimed Sands obtained from Pure Recovery Group, Emigsville, PA), "Control Mix", and "Minimum Required Strength" (i.e., calculated standard required) to Inventive compositions at 27 vol % replacement of fine aggregate with water saturated fine aggregates at 15 wt % water (Example 1), 20 wt % water (Example 2) and 25 wt % water (Example 3) to treated reclaimed bottom ash sand. Comparative compositions at 27 vol % replacement of fine aggregate with saturated fine aggregates at 30 wt % water (Comparative 1), 20 wt % water (Comparative 2), 10 wt % water (Comparative 3) to Reclaimed Sands. Additional comparative compositions at 27 vol % replacement of fine aggregate with water saturated fine aggregates at 30 wt % water (Comparative 1), 20 wt % water (Comparative 2), 10 wt % water (Comparative 3) to Raw MSWI Bottom Ash. TABLE 3 shows the composition of the control and concrete sample Examples according to the present disclosure. The compositions shown in TABLE 3 are based upon a cubic yard mix of concrete.

TABLE 3

| | | Examples Including Treated Reclaimed Bottom Ash Sand | | |
|---|---|---|---|---|
| Values are Weight (lbs) | PennDOT IIA (Control) | 15% IC Saturation (Ex. 1) | 20% IC Saturation (Ex. 2) | 25% IC Saturation (Ex. 3) |
| Cement | 350 | 350 | 350 | 350 |
| Slag | 237 | 237 | 237 | 237 |
| Coarse Aggregate | 1860 | 1860 | 1860 | 1860 |
| Water | 246 | 246 | 246 | 246 |
| Treated Reclaimed Bottom Ash Sand | — | 260 | 260 | 260 |
| Fine Aggregate | 1223 | 889 | 889 | 889 |

TABLE 4 shows the values of compressive strength for various saturation loadings at 27 vol % of the fine sands being replaced with the saturated treated reclaimed bottom ash sands in concrete at 15 wt % water in saturated treated reclaimed bottom ash sand, 20 wt % water in saturated treated reclaimed bottom ash sand, and 25 wt % water in saturated treated reclaimed bottom ash sand, according to the present disclosure.

TABLE 4

| | Peak Load (lbs) | Compressive Strength (psi) |
|---|---|---|
| EXAMPLE 1 15% (28-day) | | |
| Sample 1 | 73230 | 5827.46 |
| Sample 2 | 76870 | 6117.12 |
| Sample 3 | 75660 | 6020.83 |
| EXAMPLE 2 20% (28-day) | | |
| Sample 1 | 68360 | 5439.92 |
| Sample 2 | 70690 | 5625.33 |
| Sample 3 | 71340 | 5677.06 |

TABLE 4-continued

| | Peak Load (lbs) | Compressive Strength (psi) |
|---|---|---|
| EXAMPLE 3 25% (28-day) | | |
| Sample 1 | 69900 | 5562.47 |
| Sample 2 | 68070 | 5416.84 |
| Sample 3 | 68190 | 5426.39 |

As can be clearly seen, the raw ash contains significant fly ash which will increase the total cementitious material and reduce the water cement ratio considerably giving high compression strengths. The material including the raw bottom ash is subject to toxic elements and therefore will not satisfy environmental requirements, such as DEP requirements, as required by local ordinances. The reclaimed sands data shown in FIG. 5 meets the environmental standards having a significant portion of the fly ash removed. However, as can be seen, increasing replacement value has a significant reduction in compression strength. This reduction is associated with the presence of metallic aluminum corroding to form hydrogen gas.

It can be seen there is a sharp decrease in compression strength for the reclaimed bottom ash sands. While not being limited to any specific theory, it is believed that this drop may be attributed to the hydrogen gas expansion resulting from the corrosion of unreacted aluminum. The raw bottom ash contains significant amounts of fly ash which is a pozzolon increasing compression strength. There are two major issues with the use of raw ash. The first is the inability to use it effectively due to Department of Environmental Protection (DEP) permit limits. Secondly, there is still a vigorous hydrogen gas reaction which may lead to structural inconsistencies. It is noted that an aggregate material that meets DEP permit regulations alone does not automatically ensure that the material is suitable for use in structural concrete.

The treated reclaimed bottom ash sands meet permit requirements and the corrosive reaction with aluminum is nullified to a safe level where there is no obvious deleterious effect. Furthermore, treated reclaimed bottom ash sands are suitable for use as a Lightweight Internal Curing Fine Aggregate.

While the invention has been described with reference to one or more embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A treated reclaimed bottom ash sand comprising:
   calcium carbonate and silica;
   less than 5 wt % reactive aluminum;
   less than 5 wt % iron;
   less than 3 wt % friable particles;
   less than 5 wt % material with specific gravity less than 1.0;
   less than 5 wt % material passing #200 sieve;
   greater than 85 wt % passing #4 sieve; and
   glassy material;
   wherein the treated reclaimed bottom ash sand includes reduced hydrogen formation in concrete compared to the hydrogen formation of concrete utilizing reclaimed bottom ash sand, has internal curing properties in concrete and complies with one or more of ASTM C1761, ASTM C331, ASTM C330, or ASTM C33 standards.

2. A method for forming a treated reclaimed bottom ash sand comprising:
   providing reclaimed bottom ash sand having a particle size of less than about 3/8 inch, a specific gravity greater than 1.0, a moisture content of less than 25 wt %, at least 0.5 wt % reactive aluminum and less than 40 wt % iron;
   contacting the reclaimed bottom ash sand with an aqueous composition comprising 0.5 to 3.0M NaOH for a time greater than about 4 hours;
   rinsing and decanting the NaOH contacted reclaimed bottom ash sand; and
   removing iron from the rinsed and decanted reduced metallic aluminum reclaimed bottom ash sand to less than 5.0 wt % iron to form the treated reclaimed bottom ash sand according to claim 1, the treated reclaimed bottom ash sand having reduced hydrogen formation in concrete compared to the hydrogen formation of concrete utilizing reclaimed bottom ash sand.

3. The method of claim 2, wherein the reclaimed bottom ash sand includes from about 0.5 wt % to about 15 wt % reactive aluminum.

4. The method of claim 2, wherein the reclaimed bottom ash sand includes from about 5 wt % to about 12 wt % reactive aluminum.

5. The method of claim 2, wherein the treated reclaimed bottom ash sand includes less than 1 wt % iron.

6. The method of claim 2, wherein the treated reclaimed bottom ash sand includes less than 0.5 wt % iron.

7. The method of claim 2, wherein the treated reclaimed bottom ash sand includes reactive aluminum of less than 75% of the reactive aluminum in the reclaimed bottom ash.

8. The treated reclaimed bottom ash sand according to claim 1, wherein the treated reclaimed bottom ash sand is free of organic impurities registering a value of less than 14 on the Gardiner color wheel or #3 on the Organic plate.

9. The treated reclaimed bottom ash sand according to claim 1, wherein the treated reclaimed bottom ash sand produces a stain index of less than 60 on ASTM C641.

10. The treated reclaimed bottom ash sand according to claim 1, wherein the treated reclaimed bottom ash sand includes 20 to 30% absorption capacity in concrete.

11. A concrete comprising:
    cement;
    a fine aggregate comprising
       virgin material and
       treated reclaimed bottom ash sand according to claim 1,
    a natural coarse aggregate, and
    water.

12. The concrete according to claim 11, wherein the fine aggregate includes 10 vol % to about 50 vol % water saturated treated reclaimed bottom ash sand, and balance virgin material.

13. The concrete according to claim 11, wherein the fine aggregate includes about 27 vol % of from water saturated treated reclaimed bottom ash sand having 10 wt % to 25 wt % water, and balance virgin material.

14. The concrete according to claim 11, wherein the fine aggregate includes about 22.5 vol % of water saturated treated reclaimed bottom ash sand having from 10 wt % to 25 wt % water, and balance virgin material.

15. The concrete according to claim 11, wherein the concrete includes a compressive strength that is at least 1% greater than the compressive strength of the same concrete composition with 100 wt % virgin material as the fine aggregate.

16. The concrete according to claim 11, wherein the concrete includes a compressive strength that is at least 5% greater than the compressive strength of the same concrete composition with at least 10 wt % reclaimed bottom ash sand in the fine aggregate.

* * * * *